(12) United States Patent
Hemphill

(10) Patent No.: US 9,884,580 B2
(45) Date of Patent: Feb. 6, 2018

(54) RATCHET TIE DOWN INCORPORATING A STANDARD INTERFACE PLATE CONNECTION

(71) Applicant: Ford Global Technologies, LLC, Dearborn, MI (US)

(72) Inventor: Joshua Robert Hemphill, White Lake, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 5 days.

(21) Appl. No.: 14/920,278

(22) Filed: Oct. 22, 2015

(65) Prior Publication Data
US 2017/0113595 A1   Apr. 27, 2017

(51) Int. Cl.
*B60P 7/08* (2006.01)

(52) U.S. Cl.
CPC ............ *B60P 7/083* (2013.01); *B60P 7/0807* (2013.01); *B60P 7/0853* (2013.01)

(58) Field of Classification Search
CPC ......... B60P 7/083; B60P 3/079; B60P 7/0807; B60P 7/0846; B60P 7/0869; B60P 7/0853
USPC ......... 410/103, 100, 106, 116, 97, 102, 107, 410/110, 129; 248/35.1; 349/161, 20, 349/86; 180/51.11, 57.12
See application file for complete search history.

(56) References Cited

U.S. PATENT DOCUMENTS

| | | | |
|---|---|---|---|
| 3,762,341 A | 10/1973 | Adler | |
| 5,338,136 A * | 8/1994 | Hetchler | B60P 7/083 24/68 CD |
| 5,807,047 A * | 9/1998 | Cox | B60P 7/15 410/143 |
| 5,961,263 A * | 10/1999 | Nunez | B60P 7/0846 410/100 |
| 6,109,846 A * | 8/2000 | Davis | B60P 7/0823 410/100 |
| 6,939,095 B1 | 9/2005 | Hugg | |
| 7,789,603 B2 * | 9/2010 | Huck | B60P 7/083 410/100 |
| 7,841,815 B1 | 11/2010 | Lane | |
| 7,909,553 B2 * | 3/2011 | Snyder | B60R 9/00 410/100 |
| 8,505,467 B1 | 8/2013 | Roberts et al. | |

(Continued)

*Primary Examiner* — D Glenn Dayoan
*Assistant Examiner* — Sunsurraye Westbrook
(74) *Attorney, Agent, or Firm* — Jason Rogers; Price Heneveld LLP

(57) ABSTRACT

A ratchet assembly for a vehicle bed includes a ratchet mechanism having a ratchet frame and an interface anchor. An operable strap extends and retracts from the ratchet mechanism. An interface plate having a securing recess is disposed within a vehicle-bed sidewall that selectively receives the interface anchor. An interface bracket extends from at least one sidewall and selectively engages the interface anchor to couple the ratchet mechanism with the interface bracket. The interface bracket includes a rotating mechanism operable between an engaged position and a secured position. When the interface bracket is in the engaged position in the interface plate, the rotating mechanism is free of engagement with a securing recess and the interface bracket is operable within the interface plate. When the interface bracket is in the secured position in the interface plate, the interface bracket is free of movement within the interface plate.

5 Claims, 13 Drawing Sheets

(56) References Cited

U.S. PATENT DOCUMENTS

| | | | |
|---|---|---|---|
| 8,556,555 B2* | 10/2013 | Lesley | B60P 7/0838 410/100 |
| 9,096,159 B2 | 8/2015 | Wright | |
| 2009/0007614 A1* | 1/2009 | Armstrong | B60P 7/0807 70/287 |
| 2011/0259065 A1* | 10/2011 | Rao | E05B 27/0035 70/491 |

* cited by examiner

US 9,884,580 B2

RATCHET TIE DOWN INCORPORATING A STANDARD INTERFACE PLATE CONNECTION

FIELD OF THE INVENTION

The present invention generally relates to ratchet tie-downs that can be disposed within vehicles, and more specifically, a removable ratchet tie-down that can be attached to a vehicle bed or storage area through a standard interface plate connection.

BACKGROUND OF THE INVENTION

Various vehicles include ratchet tie-downs or connection locations to attach various ratchet tie-downs. These ratchet tie-downs are used to secure cargo and other various objects within storage areas of vehicles. Typically, a ratchet tie-down includes two straps that extend from opposite sides of the ratchet tie-down, the first strap being of a finite length and connecting to a sidewall of a vehicle, and the second strap being adjustable through use of the ratchet tie-down for placing tension upon the ratchet tie-down system. This configuration causes the ratchet tie-down mechanism to be suspended between the two straps such that various vibration and other movement of the ratchet tie-down mechanism is possible during operation of a vehicle.

SUMMARY OF THE INVENTION

According to one aspect of the present invention, a ratchet assembly for a vehicle bed includes a ratchet mechanism having a ratchet frame and a rigid interface anchor coupled to the ratchet frame. The ratchet mechanism also includes an operable strap that is selectively extended and retracted from a housing of the ratchet mechanism through operation of at least one ratchet lever. An interface plate is disposed within a vehicle-bed sidewall that selectively receives the interface anchor within the vehicle-bed sidewall, the interface plate including a securing recess at least partially defined by an inward surface of the interface plate. An interface bracket selectively extends from the interface anchor, wherein the interface bracket selectively engages the interface anchor to couple the ratchet mechanism to the interface bracket. The interface bracket includes a rotating mechanism operable between a plurality of rotational positions, wherein the plurality of rotational positions of the rotating mechanism includes an engaged position and a secured position. When the interface bracket is received by the interface plate, the engaged position is defined by the rotating mechanism being free of engagement with the securing recess and further defined by the interface bracket being at least partially operable within the interface plate. The secured position is defined by the rotating mechanism being engaged within the securing recess and the interface bracket being substantially free of movement within the interface plate.

According to another aspect of the present invention, a vehicle-bed tie-down ratchet includes a ratchet having a ratcheting assembly for operating a strap to extend and retract from a housing of the ratchet, an interface bracket extending from a ratchet frame and an interface plate disposed within a vehicle-bed sidewall that selectively receives the interface bracket to selectively fix the ratchet against the vehicle-bed sidewall.

According to another aspect of the present invention, a vehicle-bed tie-down ratchet includes a ratchet having a frame and an operable strap that selectively extends from and retracts from the frame. An interface bracket is disposed within the frame and perpendicularly extends from an exterior surface of the frame. An interface plate is disposed within a vehicle-bed sidewall that selectively receives the interface bracket to position the ratchet against the vehicle-bed sidewall.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
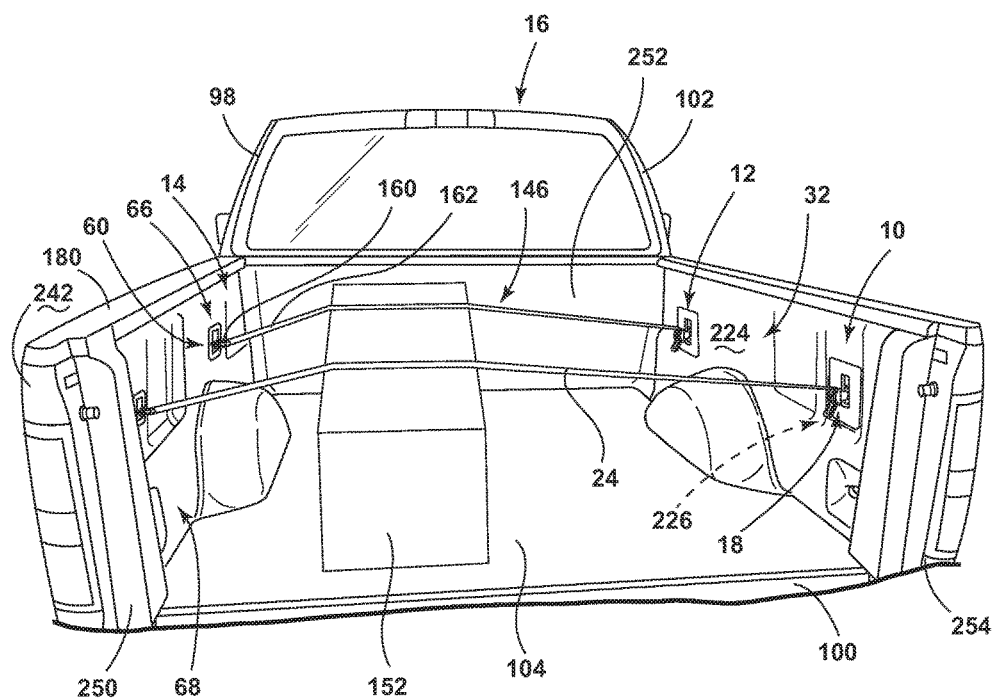
FIG. 1 is a rear perspective view of a vehicle with an aspect of the ratchet tie-down assembly incorporated within a standard interface plate.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-9, reference numeral 10 generally refers to a ratchet assembly, such as a ratchet tie-down assembly, that can be installed as part of a standard interface plate assembly within a vehicle bed 14 of a pick-up truck or other vehicle 16, according to at least one aspect of the various embodiments of the device. The ratchet assembly 10 for the vehicle bed 14 includes a ratchet mechanism 18 having a ratchet frame 20 and a rigid interface anchor 22 coupled to the ratchet frame 20. The ratchet mechanism 18 also includes an operable strap 24 that is selectively extended and retracted from a housing 26 of the ratchet assembly 10 through operation of at least one ratchet lever 28. An interface plate 12 is disposed within a vehicle-bed sidewall 32 that is configured to selectively receive the interface anchor 22 within the vehicle-bed sidewall 32. The interface plate 12 includes a securing recess that is at least partially defined by an inward surface 36 of the interface plate 12. An interface bracket 38 selectively extends from the interface anchor 22, wherein the interface bracket 38 selectively engages the interface anchor 22. In this manner, the engagement between the interface bracket 38 and the interface anchor 22 serve to couple the ratchet assembly 10 to the interface bracket 38. The interface bracket 38 includes a rotating mechanism 40 that is operable between a plurality of rotational positions. The plurality of rotational positions of the rotating mechanism 40 can include an engaged position 42 and a secured position 44, when the interface bracket 38 is received by the interface plate 12. The engaged position 42 is defined by the rotating mechanism 40 free of engagement with the securing recess and further defined by the interface bracket 38 being at least partially operable within the interface plate 12. The secured position 44 of the rotating mechanism 40 is defined by the rotating mechanism 40 being engaged with the securing recess and the interface bracket 38 being substantially free of movement within the interface plate 12. It is contemplated that the interface bracket 38 is adapted to selectively engage the interface anchor 22 such that the interface bracket 38 serves as a securing carriage that allows for selective engagement between the ratchet assembly 10 and the interface plate 12.

Referring again to FIGS. 1-9, 11 and 12, it is contemplated that the tie-down ratchet assembly 10 can also include a tie-down ring 60 having a second rigid interface anchor 62. A second interface bracket 64 is included that selectively receives the second rigid interface anchor 62. A second interface plate 66 can be disposed within an opposing sidewall 68 of the vehicle bed 14, or other portion of the vehicle 16, that selectively receives the second interface bracket 64 to selectively fix the tie-down ring 60 against the opposing sidewall 68 of the vehicle bed 14. It is contemplated that the operable strap 24 is selectively extendable from the ratchet mechanism 18 that is selectively secured within the interface plate 12 and across the vehicle bed 14 to the tie-down ring 60 that is secured within the second interface plate 66. The tie-down ring 60 can include a tie-down frame 70 from which the second interface anchor 62 extends and which holds the securing feature 148 in place. It is contemplated that the securing feature 148 can be a separate member or can be integral with the tie-down frame 70. It is further contemplated that the ratchet lever 28 of the ratchet mechanism 18 is operable to tension the strap between the tie-down ring 60 and the ratchet mechanism 18.

Referring again to FIGS. 1-9, it is contemplated that the rotating mechanism 40 of the interface bracket 38 can include a rotational member 80 that operates the rotating mechanism 40 between the plurality of rotational positions. It is further contemplated that the rotational member 80 can extend through a portion of the interface bracket 38 such that the rotational member 80 is operable from a front side 82 of the ratchet mechanism 18 and can be accessed when the interface bracket 38 is disposed within the interface plate 12 and the rotating mechanism 40 is in any of the plurality of the rotational positions. According to the various embodiments, the rotational member 80 can be any one of the various rotational mechanisms that can include, but are not limited to, a keyed cylinder 84, a knob, a rotating lever, combinations thereof, and other similar rotating-type members.

Referring again to FIGS. 1-9, it is contemplated that the ratchet mechanism 18 can be part of a ratchet assembly 10 for a vehicle-bed tie-down system, where the ratchet assembly 10 includes the ratchet mechanism 18 having a ratcheting apparatus 90 for operating the operable strap 24 to extend and retract from a housing 26 of the ratchet mechanism 18. An interface bracket 38 is configured to extend from a ratchet frame 20 of the ratchet mechanism 18. The interface plate 12 is disposed within the vehicle-bed sidewall 32, or other portion of the vehicle 16, where the interface plate 12 is configured to selectively receive the interface bracket 38 to selectively fix the ratchet mechanism 18 against a portion of the vehicle 16. As discussed above, the ratchet assembly 10, according to various aspects of the device, can also include an interface bracket 38 that serves as the carriage that helps to secure the ratchet mechanism 18 to the interface plate 12 of the vehicle 16.

Referring again to FIGS. 1-9, it is contemplated that the interface bracket 38 of the ratchet assembly 10 can extend perpendicularly from the ratchet frame 20 of the ratchet mechanism 18. In this manner, the interface plate 12 of the vehicle 16 can be positioned vertically within the sidewall 32 of the vehicle bed 14. Accordingly, selective engagement between the interface bracket 38 and the interface plate 12 provides primary vertical support for securing the ratchet mechanism 18 to the sidewall 32 of the vehicle bed 14. According to the various embodiments, it is contemplated that the interface plate 12 of a vehicle 16 can be installed in any one of various positions of the vehicle 16, where such positions can include, but are not limited to, various vehicle storage areas, external portions of a vehicle, horizontal surfaces of the vehicle body 98 and/or the frame of the vehicle 16, a tailgate 100, vehicle doors 102, a floor 104 of a vehicle bed 14, and other similar positions of the vehicle 16 that can hold and secure an interface plate 12 for receiving the various aspects of the ratchet assembly 10.

Referring again to FIGS. 1-9, the interface bracket 38 can include the rotating mechanism 40 that operates between the engaged and secured positions 42, 44 when the interface bracket 38 is received by the interface plate 12. The rotating mechanism 40 can include a securing flange 110 that is substantially free of engagement with the interface plate 12 when the rotating mechanism 40 is in the engaged position 42. The securing flange 110 can selectively extend into a securing recess of the interface plate 12 when the rotating mechanism 40 is in the secured position 44. According to the various embodiments, the secured position 44 is further defined by a portion of the interface plate 12 being secured between the securing flange 110 and the ratchet frame 20 of the ratchet mechanism 18.

According to the various embodiments, where the ratchet mechanism 18 includes the interface bracket 38, the ratchet mechanism 18 can include the rigid interface anchor 22 that extends outward from the ratchet frame 20 of the ratchet assembly 10. In such an embodiment, the rigid interface anchor 22 is selectively received within the interface bracket 38. Accordingly, the rigid interface anchor 22 is configured to be free of removal from the interface bracket 38 when the interface bracket 38 is received within the interface plate 12 when the interface bracket 38 is in either of the engaged or secured positions 42, 44.

Referring again to FIGS. 1-9, in the various embodiments that incorporate both the ratchet mechanism 18 and the tie-down ring 60 within the ratchet assembly 10, the interface bracket 38 and the second interface bracket 64 can be interchanged between the tie-down ring 60 and the ratchet mechanism 18. In this manner, the ratchet assembly 10 that can be installed within the various interface plates 12 of the vehicle 16 can include a plurality of interface brackets 38 that are substantially identical such that any interface bracket 38 can be attached to any one of the ratchet mechanisms 18 and/or any one of the tie-down rings 60 of the ratchet assembly 10. Alternatively, according to various embodiments, it is contemplated that certain interface brackets 38 can be configured to receive only a specific component or a specific type of component such as only ratchet mechanisms 18 or only tie-down rings 60 of the ratchet tie-down assembly.

Figure 10:
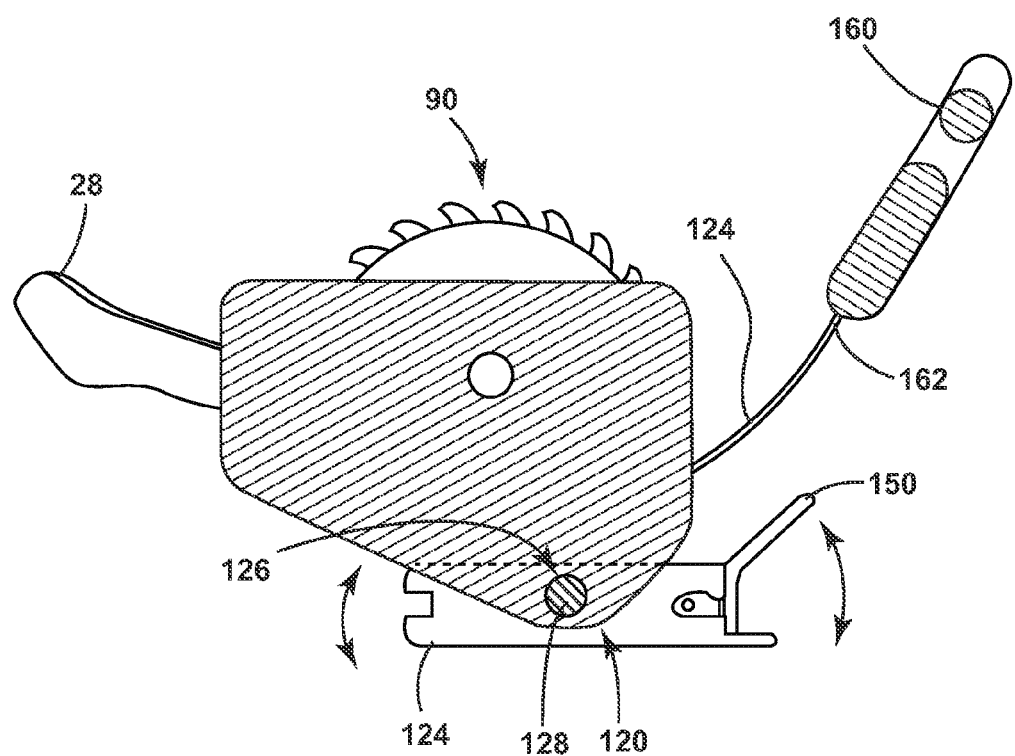
FIG. 10 is a cross-sectional view of an aspect of the ratchet tie-down mechanism illustrating a pivot connection between the ratchet tie-down mechanism and the standard interface plate connection.
Figure 11:
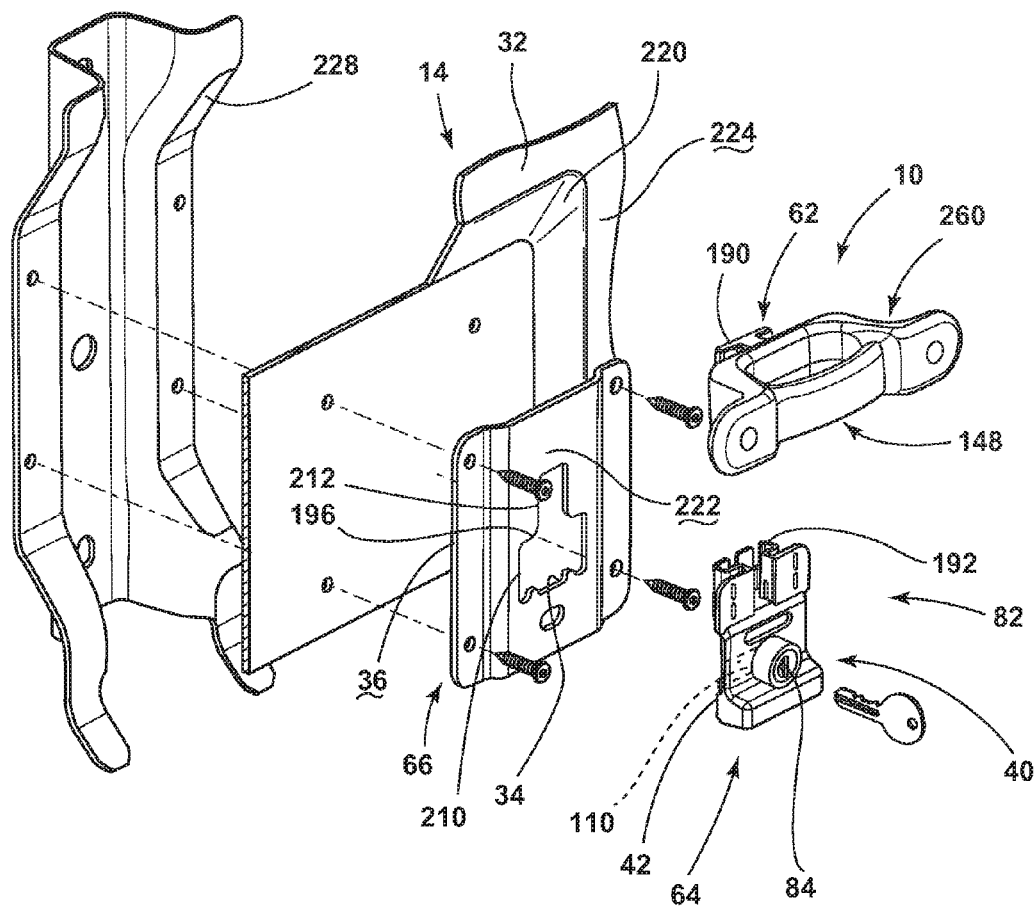
FIG. 11 is an exploded perspective view of an aspect of the tie-down ring for the ratchet tie-down assembly.
Figure 12:
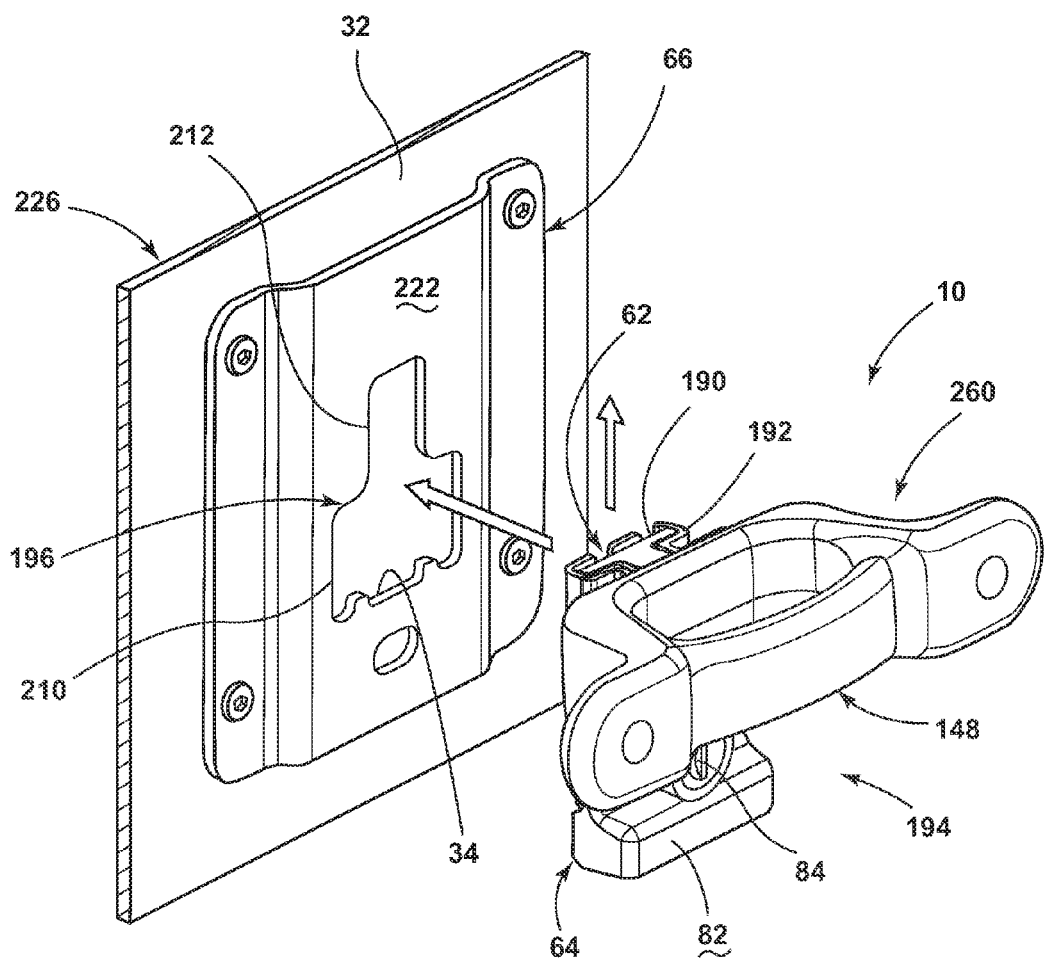
FIG. 12 is a partially exploded view of the tie-down ring of FIG. 11 showing installation of the tie-down ring of the ratchet tie-down assembly into the standard interface plate assembly of a vehicle.

Referring now to FIG. 10, it is contemplated that the rigid interface anchor 22 can be a separate and operable piece that is engaged at a pivot 120 with the ratchet frame 20 of the ratchet mechanism 18. In such an embodiment, it is contemplated that the attachment between the pivotally operable rigid interface anchor 22 and the interface plate 12 can result in the ratchet mechanism 18 having a limited amount of rotational movement in a single plane that can serve to minimize structural stresses placed upon the ratchet mechanism 18 during use. The pivotally operable rigid interface anchor 22 can also serve to provide more convenient access to the ratchet lever 28 and/or the release lever 122 of the ratchet mechanism 18 during use to secure various cargo 152 within the vehicle 16. It is contemplated that the pivot 120 can also be incorporated within the tie-down ring 60 to allow the second interface anchor 62 to be at least partially operable relative to the tie-down frame 70.

According to the various embodiments, the pivotal connection between the rigid interface anchor 22 and the frame of the ratchet mechanism 18 can be at various points of the frame. By way of example, and not limitation, the pivot 120 that provides for the connection between the rigid interface anchor 22 and the ratchet frame 20 can be at a base 124 of the ratchet mechanism 18 or at a front, rear, side, top, or other surface of the ratchet mechanism 18. It is also contemplated that the ratchet mechanism 18 can include a plurality of pivot receptacles 126 for receiving a pivot pin 128 that can allow the rigid interface anchor 22 to be moved to various locations on the ratchet mechanism 18 such that the rigid interface anchor 22 can be pivotally secured to the frame of the ratchet mechanism 18 and a location of the rigid interface anchor 22 can provide for convenient access by the user to the ratchet lever 28 and release lever 122, depending upon the location of the ratchet mechanism 18 within the interface plate 12 of the vehicle 16. By way of example, and not limitation, positioning the ratchet mechanism 18 on a sidewall 32 of a vehicle bed 14 to extend across to the opposing sidewall 68 of the vehicle bed 14 may be most convenient when the pivot 120 is at a base 124 of the frame of the ratchet mechanism 18. Alternatively, when the ratchet mechanism 18 is disposed in an interface plate 12 along a floor 104 of the vehicle bed 14, the pivot 120 may be more conveniently located at a side or the rear of the ratchet frame 20 of the ratchet mechanism 18.

According to various embodiments, it is also contemplated that the rigid interface anchor 22 can be an integral piece of the ratchet frame 20 of the ratchet mechanism 18 such that the rigid interface anchor 22 is attached and fixedly secured to the ratchet frame 20 of the ratchet mechanism 18. In such an embodiment, it is contemplated that the ratchet mechanism 18 can include a single rigid interface anchor 22. Alternatively, the ratchet mechanism 18 can include multiple rigid interface anchors 22 extending from portions of the ratchet frame 20 to provide for alternative positioning or orientations of the ratchet mechanism 18 for engaging the various interface plates 12 of the vehicle 16 and/or the various interface brackets 38 that can be received within the interface plates 12 of the vehicle 16.

Referring again to FIGS. 1-9, it is contemplated that the ratcheting apparatus 90 of the ratchet mechanism 18 can include a spool 140 that receives the operable strap 24 and serves to contain the operable strap 24 when in the retracted position 144 of the operable strap 24. A biasing mechanism 142, such as a spring, tensioned coil or other biasing mechanism 142 can be attached between the spool 140 and the ratchet frame 20 of the ratchet mechanism 18 to bias the operable strap 24 towards a retracted position 144. When in use, the user can pull the operable strap 24 from the retracted position 144. In this manner, the ratcheting apparatus 90 freely allows the extension of the operable strap 24 to any one of the various extended positions 146. The extended position 146 can be defined by any position that is outside of the retracted position 144 whether secured or unsecured to a securing feature 148 of the ratchet assembly 10. The user can extend the operable strap 24 to engagement with another portion of the vehicle 16, the tie-down ring 60, an interface plate 12, an interface bracket 38 disposed within an interface plate 12, or another portion of the vehicle 16 that defines a securing feature 148. It is also contemplated that the ratchet mechanism 18 can include an integral securing feature 150 (exemplified in FIG. 10) that can allow the operable strap 24 to be extended around the piece of cargo 152 and secured back on the integral securing feature 150 such that no additional securing features 148 within the vehicle 16 are used. Such a configuration can be particularly useful when the cargo 152 being stored is relatively small, or where the cargo 152 may be secured against a surface of the side rail of the vehicle bed 14.

Once the operable strap 24 is connected to the securing feature 148, whether part of the ratchet assembly 10 or a separate securing feature 148, a hook 160 disposed at the end 162 of the operable strap 24 is engaged with the securing feature 148 to maintain the operable strap 24 in the extended position 146. Once in this extended position 146, the ratchet lever 28 of the ratcheting apparatus 90 can be operated to manipulate the ratcheting apparatus 90 to place tension upon the operable strap 24. The ratcheting apparatus 90 can include a plurality of cogs or teeth 164 that can engage various retaining portions 166 within the ratcheting apparatus 90 to allow for tensioning of the operable strap 24. The ratchet lever 28 can be operated until the desired tension is achieved. When the cargo 152 is desired to be removed from the vehicle 16, a release mechanism, such as the release lever 122, release button, switch, tab or other similar release mechanism, of the ratchet mechanism 18 can be activated such that the cogs 164 and retaining portions 166 of the ratcheting apparatus 90 are disengaged and the tension placed upon the operable strap 24 is removed such that the hook 160 on the end 162 of the operable strap 24 can be removed from the securing feature 148 and the operable strap 24 can be biased back into the retracted position 144 around the spool 140 within the housing 26 of the ratchet mechanism 18.

According to the various embodiments, where the rigid interface anchor 22 is directly attached to the ratchet frame 20 of the ratchet mechanism 18, the ratchet mechanism 18 can be secured within the interface plate 12 of the vehicle 16 and be substantially free of movement or free of movement within the interface plate 12 during operation of the vehicle 16. Accordingly, only the operable strap 24 extends between the interface plate 12 and the securing feature 148 in another location of the vehicle 16. In this manner, during operation of the vehicle 16, the ratchet mechanism 18 is not suspended between the sidewall 32 and the opposing sidewall 68 of the vehicle 16, where movement of the vehicle 16 can cause unwanted vibration, or other movement as can be experienced in a conventional ratchet mechanism 18, resulting in loosening of the conventional strap. By securing the ratchet mechanism 18 according to the various aspects of the present device directly to the interface plate 12, movement of the ratchet mechanism 18 during operation of the vehicle 16 is substantially eliminated, thereby resulting in less movement, stretching, or other displacement of the operable strap 24 during use of the vehicle 16.

Referring again to the various embodiments as exemplified in FIGS. 1-12, it is contemplated that the ratchet mechanism 18 can include a ratchet frame 20 and an operable strap 24 that selectively extends and retracts from the ratchet frame 20. As discussed above, a spool 140 is configured to contain and bias the operable strap 24 in the retracted position 144, where the spool 140 is engaged with the ratchet frame 20 of the ratchet mechanism 18 to structurally retain the spool 140 and allow for rotational movement of the spool 140 as the operable strap 24 moves between the retracted and extended positions 144, 146. The biasing mechanism 142 of the spool 140 can also be attached between the spool 140 and the ratchet frame 20 of the ratchet mechanism 18. According to the various embodiments, an interface bracket 38 can be disposed within the ratchet frame 20 and configured to perpendicularly extend from an exterior surface of the ratchet frame 20. As discussed above, the interface bracket 38 can be defined by the rigid interface anchor 22, or can be defined by a separate interface bracket 38 that can be engaged with the rigid interface anchor 22 to engage the interface plate 12. According to the various embodiments, the interface plate 12 is disposed within a sidewall 32 of the vehicle bed 14 that selectively receives the interface bracket 38 to position the ratchet mechanism 18 against the sidewall 32. As discussed above, the interface plate 12 can be disposed in various alternate locations, such as the floor 104 of the vehicle bed 14, the top rails 180 of the vehicle bed 14, exterior surfaces of the vehicle 16, interior portions of the vehicle 16, and other similar structurally stable locations of the vehicle 16. Where the ratchet mechanism 18 is secured to the interface plate 12 within the sidewall 32 of the vehicle bed 14, the ratchet mechanism 18 is secured to the sidewall 32 such that the ratchet mechanism 18 does not dangle, hang, or otherwise droop towards the floor 104 of the vehicle bed 14 and is free of engagement with the floor 104 of the vehicle bed 14.

Referring now to FIGS. 7-9 and 11-12, in embodiments incorporating an interface bracket 38, the rigid interface anchor 22 can include a sliding flange 190 that defines an outward portion of the rigid interface anchor 22. The sliding flange 190 can be configured to engage a flange recess 192 of the interface bracket 38, such that when the sliding flange 190 is engaged with the flange recess 192, the rigid interface anchor 22 and the interface bracket 38 form a locking unitary assembly 194 that can be installed within the interface plate 12. The interface plate 12 can include a slot 196 that is configured to receive the rigid interface anchor 22 and the interface bracket 38 connected as the unitary locking assembly. Accordingly, the rigid interface anchor 22 and the interface bracket 38, when disposed within the interface plate 12, can at least partially define the engaged position 42 and/or the secured position 44 of the rotating mechanism 40.

Referring again to FIGS. 7-9 and 11-12, when the sliding flange 190 of the rigid interface anchor 22 is secured within the flange recess 192 of the interface bracket 38 to define the unitary locking assembly, and the unitary locking assembly is disposed within the slot 196 of the interface plate 12, the rigid interface anchor 22 is substantially secured within the slot 196 of the interface plate 12 and is unable to be removed from the interface bracket 38, unless the interface bracket 38 is first removed from the slot 196 of the interface plate 12. Additionally, the interface bracket 38 can include the rotating mechanism 40 that operates the securing flange 110. In this manner, the securing flange 110 can be a single flange member that extends outward from the rotating mechanism 40.

Referring again to FIGS. 7-9 and 11-12, in order to engage the interface bracket 38 with the slot 196 of the interface plate 12, the interface bracket 38 can be moved inward through an enlarged portion 210 of the slot 196 and then slid upward through a narrowed portion 212 of the slot 196 in order to secure the sliding flange 190 within the narrowed portion 212 of the slot 196 of the interface plate 12. Once the sliding flange 190 is moved within the narrowed portion 212 of the slot 196, the portion of the interface bracket 38 having the securing flange 110 can be positioned proximate the securing recess. Once positioned in this manner, the rotating mechanism 40 can be rotated from the engaged position to the secured position 44, to move the securing flange 110 into the securing recess, thereby locking the ratchet mechanism 18 in position and against the vehicle 16.

Referring again to FIGS. 7-9 and 11-12, the sidewall 32 of the vehicle bed 14 can include a recessed portion 220 that is configured to receive the interface plate 12. The recess portion of the sidewall 32 is configured to position an outer surface 222 of the interface plate 12 to be substantially flush with the remainder of the inward-facing surface 224 of the sidewall 32. Additionally, a cavity 226 of the sidewall 32 can include a reinforcement structure 228 that is configured to receive both the interface plate 12 and the recessed portion 220 of the sidewall 32. In this manner, the reinforcement structure 228 can substantially secure the interface plate 12 and allow the interface plate 12 to receive the various loads placed thereon when the ratchet mechanism 18 is engaged thereto and tension is applied on the ratchet mechanism 18 via the operable strap 24.

Figure 13:
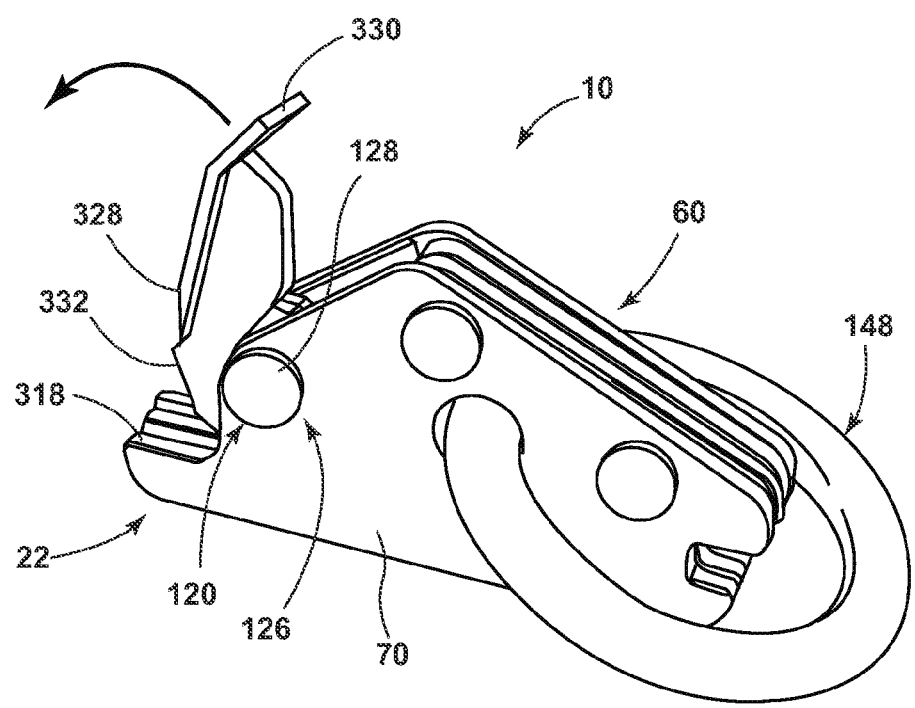
FIG. 13 is a perspective view of an aspect of a tie-down ring of the ratchet assembly.
Figure 14:
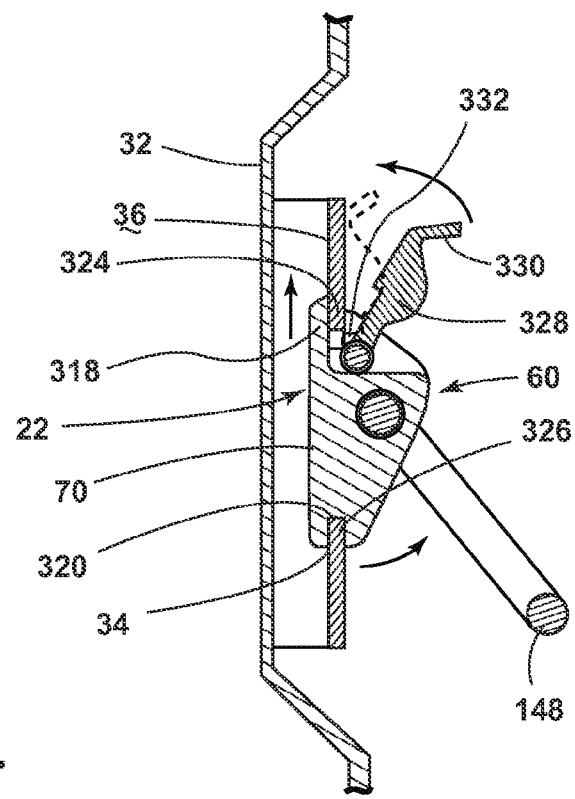
FIG. 14 is a cross-sectional view of the tie-down ring of FIG. 13 installed within an aspect of the interface plate.
Figure 15:
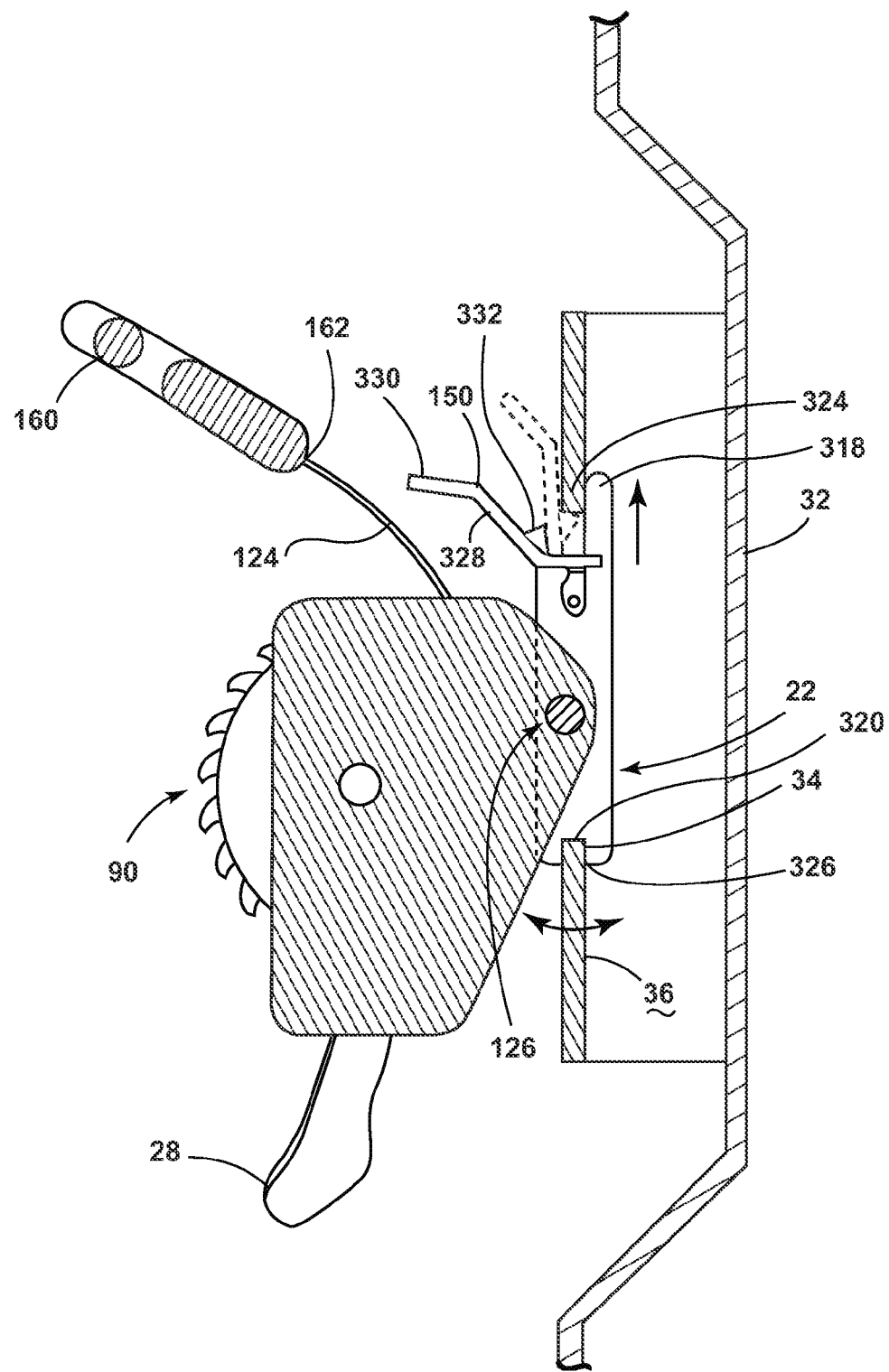
FIG. 15 is a cross-sectional view of an aspect of the ratchet mechanism installed within an aspect of the interface plate.

Referring now to FIGS. 13-15, it is contemplated that the interface anchor 22 that is attached to the ratchet frame 20 for the ratchet mechanism 18 can be configured to be directly installed within the slot 196 of the interface plate 12. In such an embodiment, the ratchet mechanism 18 and the tie-down ring 60 each include an interface anchor 22 that extends across both the enlarged portion 210 and the narrowed portion 212 of the slot 196 of the interface plate 12. In such an embodiment, the interface anchor 22 can be directly integrated with the ratchet frame 20 and the tie-down frame 70 or can be incorporated within the pivotable bases 124 attached at the pivot 120 to the ratchet frame 20 and the tie-down frame 70. According to the various embodiments, the interface anchor 22, exemplified in FIGS. 13-15, can include an upper notch 318 and a lower notch 320. It is contemplated that the upper notch 318 is configured to engage a top portion 324 of the narrowed portion 212 of the slot 196. The lower notch 320 is configured to engage a bottom portion 326 of the enlarged portion 210 of the slot 196. In this manner, the lower notch 320 engages the securing recess 34 defined within the slot 196 of the interface plate 12.

Referring again to FIGS. 13-15, to install the interface anchor 22 within the slot 196 of the interface plate 12, according to an exemplary installation process, the upper notch 318 can be engaged with a top portion 324 of the narrowed portion 212. It is contemplated that the upper notch 318 can include a taller rear portion that can be inserted within the slot and shifted upward such that the lower notch 320 of the interface anchor 22 can be inserted over the securing recess 34 of the slot 196. The interface anchor 22 can be slid downward such that the lower notch 320 engages the securing recess 34 and the lower notch 320 surrounds at least a portion of the perimeter of the slot 196 at the securing recess 34. When the lower notch 320 is engaged with the securing recess 34, the upper notch 318 is positioned against or adjacent to the inward surface 36 of the interface plate 12 that faces the sidewall 32 of the vehicle 16. In order to secure the interface anchor 22 within the slot 196, the upper notch 318 can include the taller rear portion and a shorter forward portion, such that the upper notch 318 can be engaged with the top portion 324 of the slot 196 and shifted upward such that the lower notch 320 can be positioned over the securing recess 34 and then moved downward such that the securing recess 34 receives the lower notch 320, while the upper notch 318 remains engaged with the top portion 324 of the slot 196.

Referring again to FIGS. 13-15, it is contemplated that the interface anchor 22 can include a biasing lever 328 that is biased upward such that the biasing lever 328 engages a front of the interface plate 12. In this manner, the biasing lever 328 engages the interface plate 12 at a top portion 324 of the slot 196. The biasing lever 328 presses against the front surface of the interface plate 12, and the upper notch 318 engages the inner surface 36 of the interface plate 12 such that the top portion 324 of the interface plate 12 is positioned between a portion of the upper notch 318 and the biasing lever 328. The biasing lever 328 can include a notch portion 332 that engages a portion of the slot 196 when the biasing lever 328 is against the interface plate 12. When the biasing lever 328 is positioned against the interface plate 12, portions of the interface anchor 22, including the upper and lower notches 318, 320 and the notch portion 332 of the biasing lever 328, extend the full height of the slot 196. In this manner, the interface anchor 22 is substantially free of, or free of, vertical movement within the slot 196. It is further contemplated that the biasing lever 328 can include a release flange 330 that provides the user with a member to engage to move the biasing lever 328 away from the interface plate 12 such that the interface anchor 22 can be shifted upward such that the lower notch 320 is removed from the securing recess 34 and rotated out from the slot 196 to separate the interface anchor 22 from the slot 196 of the interface plate 12. As discussed above, the ratchet frame 20 and the tie-down frame 70 can each include the upper and lower notches 318, 320 as well as the biasing lever 328 for installing the ratchet mechanism 18 and the tie-down ring 60, respectively, into the various slots 196 of the interface plate 12. In such an embodiment, the ratchet mechanism 18 and the tie-down ring 60 can each be installed within the slot 196 of the interface plate 12 without the use of the interface bracket 38.

Figure 2:
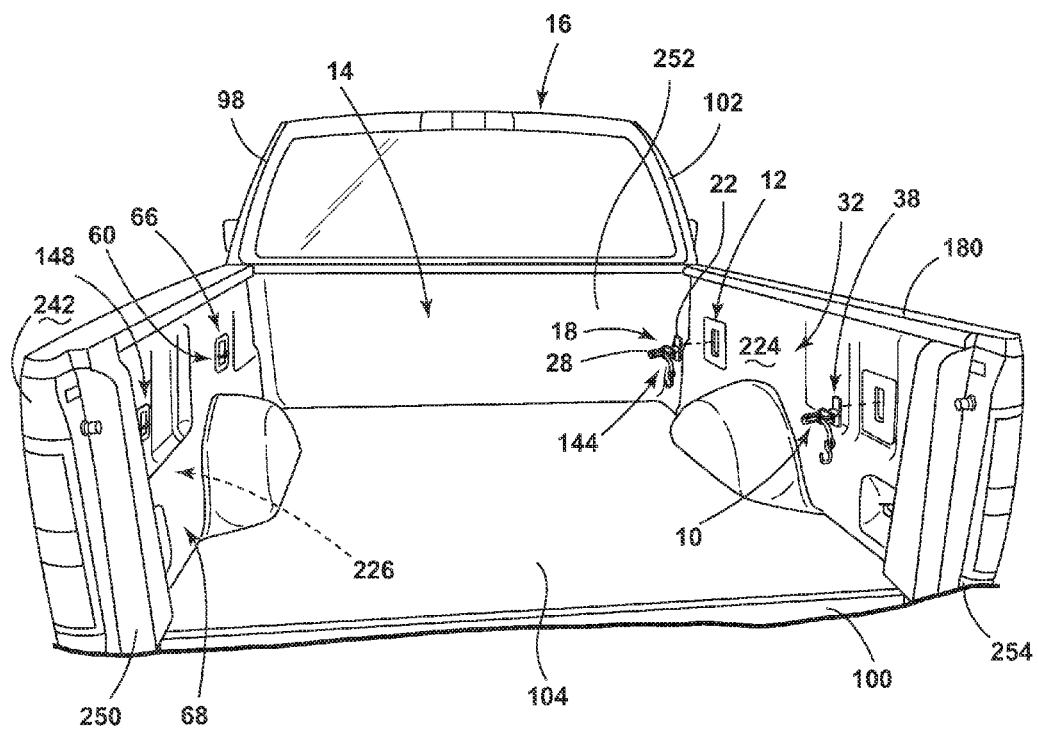
FIG. 2 is a partially exploded rear perspective view of the vehicle of FIG. 1 with the ratchet tie-down assembly removed from the standard interface plate of the vehicle.
Figure 3:
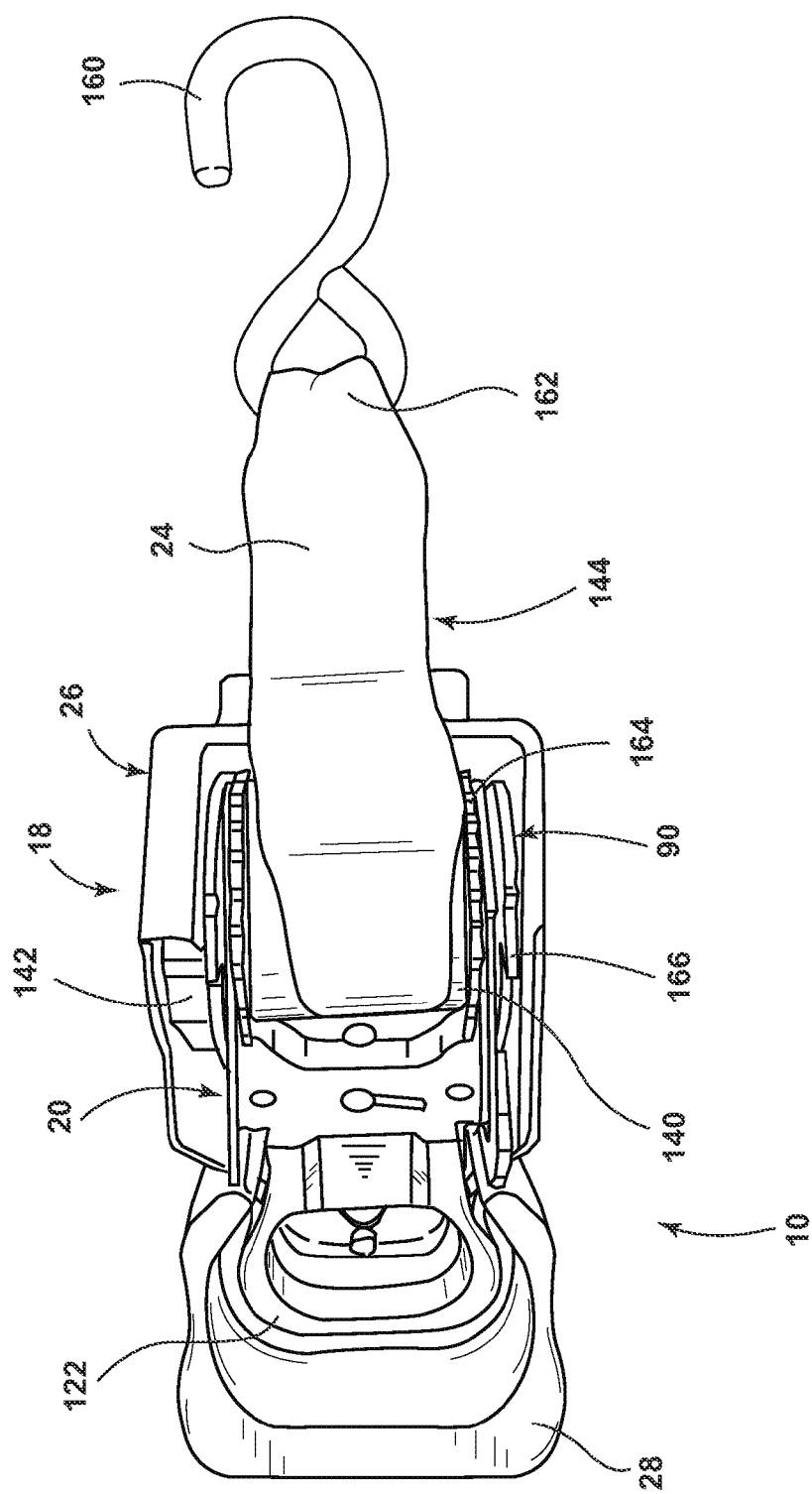
FIG. 3 is a top perspective view of an aspect of the ratchet tie-down mechanism for the ratchet tie-down assembly.
Figure 5:
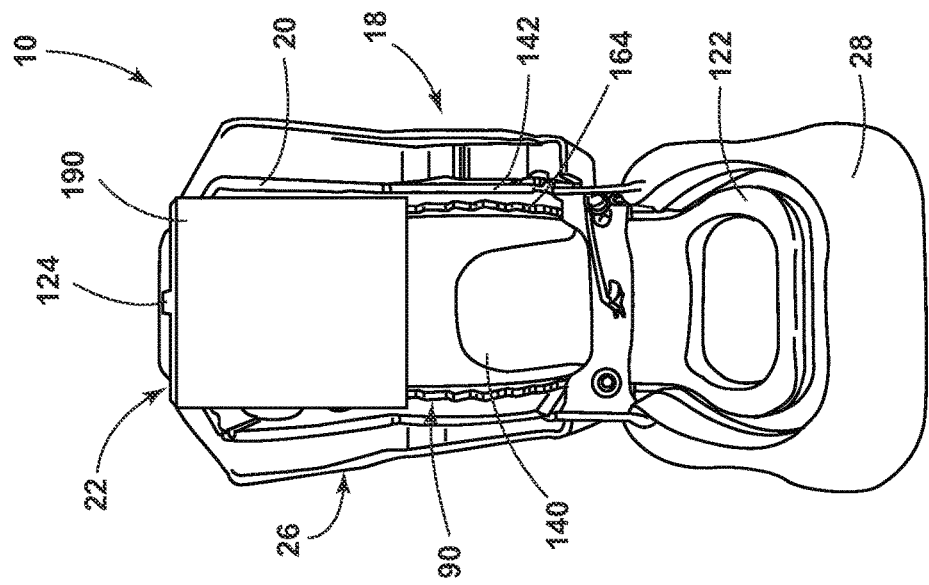
FIG. 5 is a bottom plan view of the ratchet tie-down assembly of FIG. 3.
Figure 4:
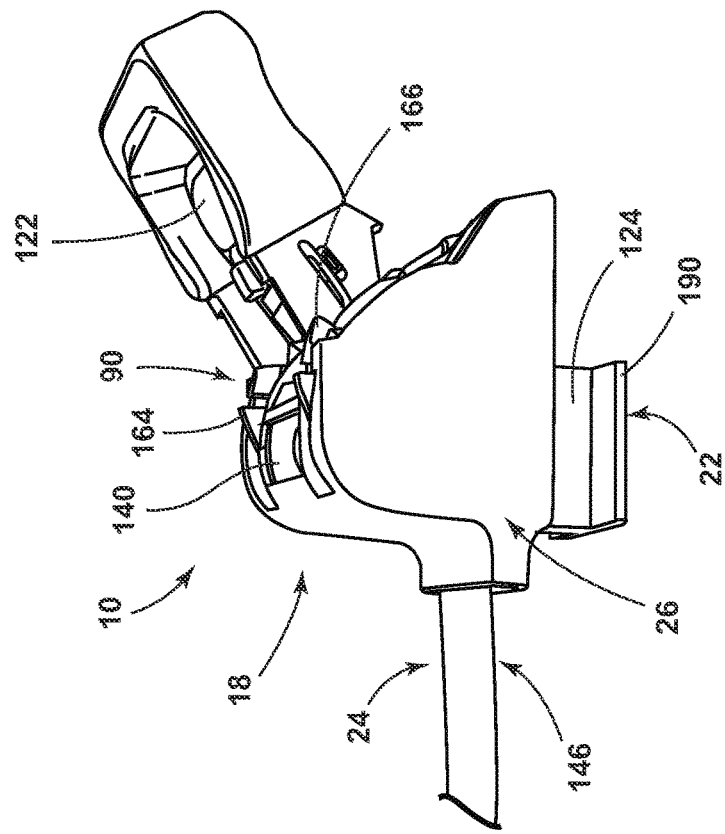
FIG. 4 is a side perspective view of the ratchet tie-down mechanism of FIG. 3.
Figure 6:
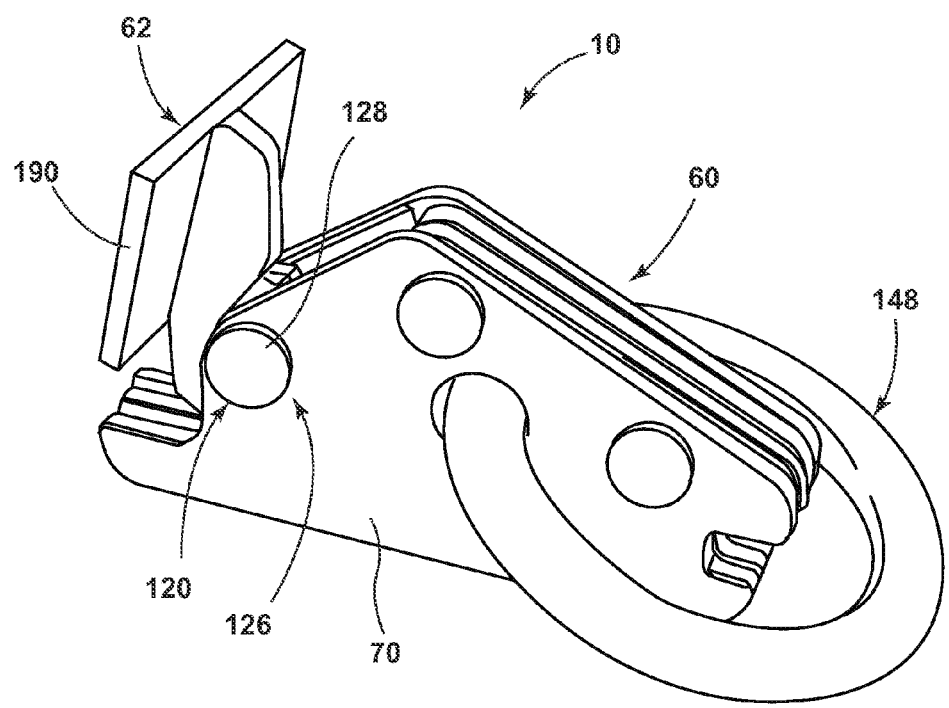
FIG. 6 is a side perspective view of an aspect of a tie-down ring incorporated within the ratchet tie-down assembly and having a standard interface plate connection.
Figure 7:
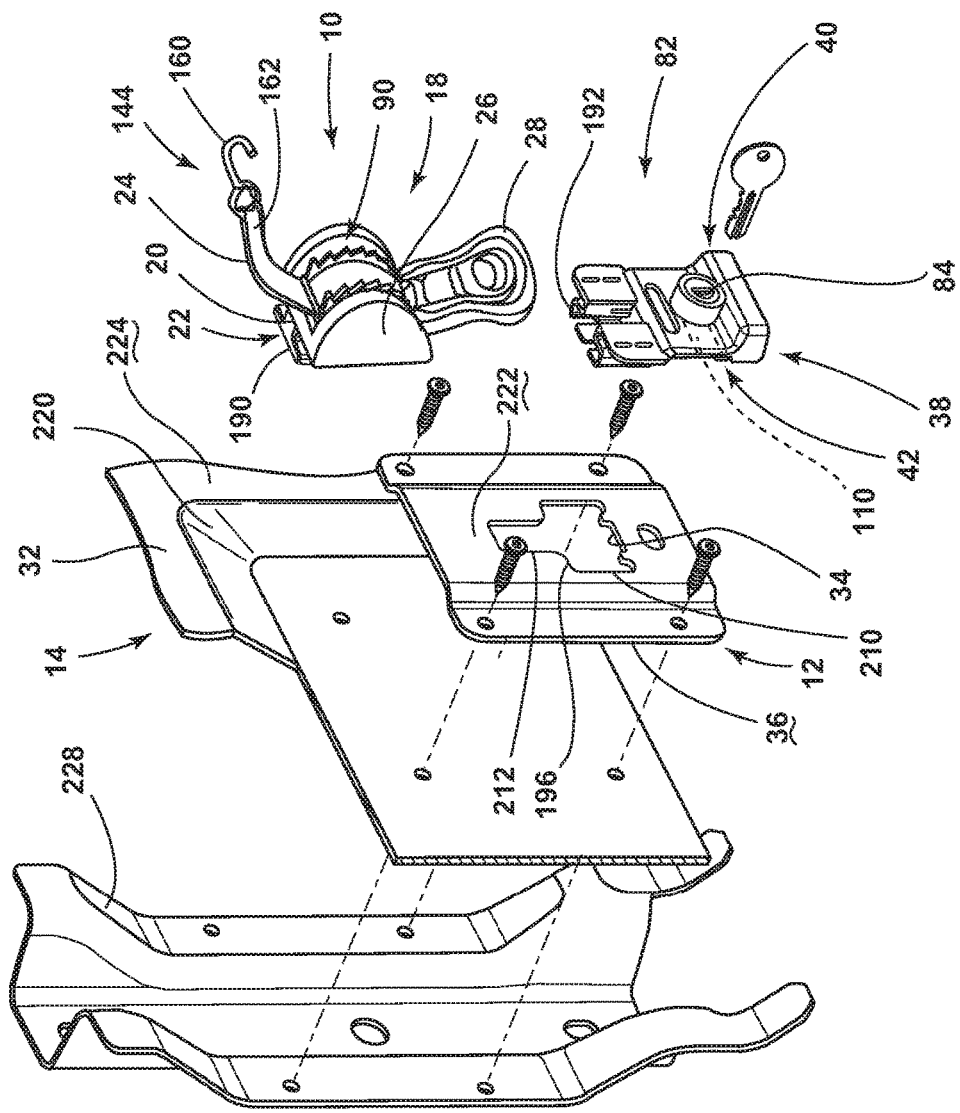
FIG. 7 is an exploded perspective view of an aspect of the ratchet tie-down assembly and the standard interface plate for a vehicle.
Figure 8:
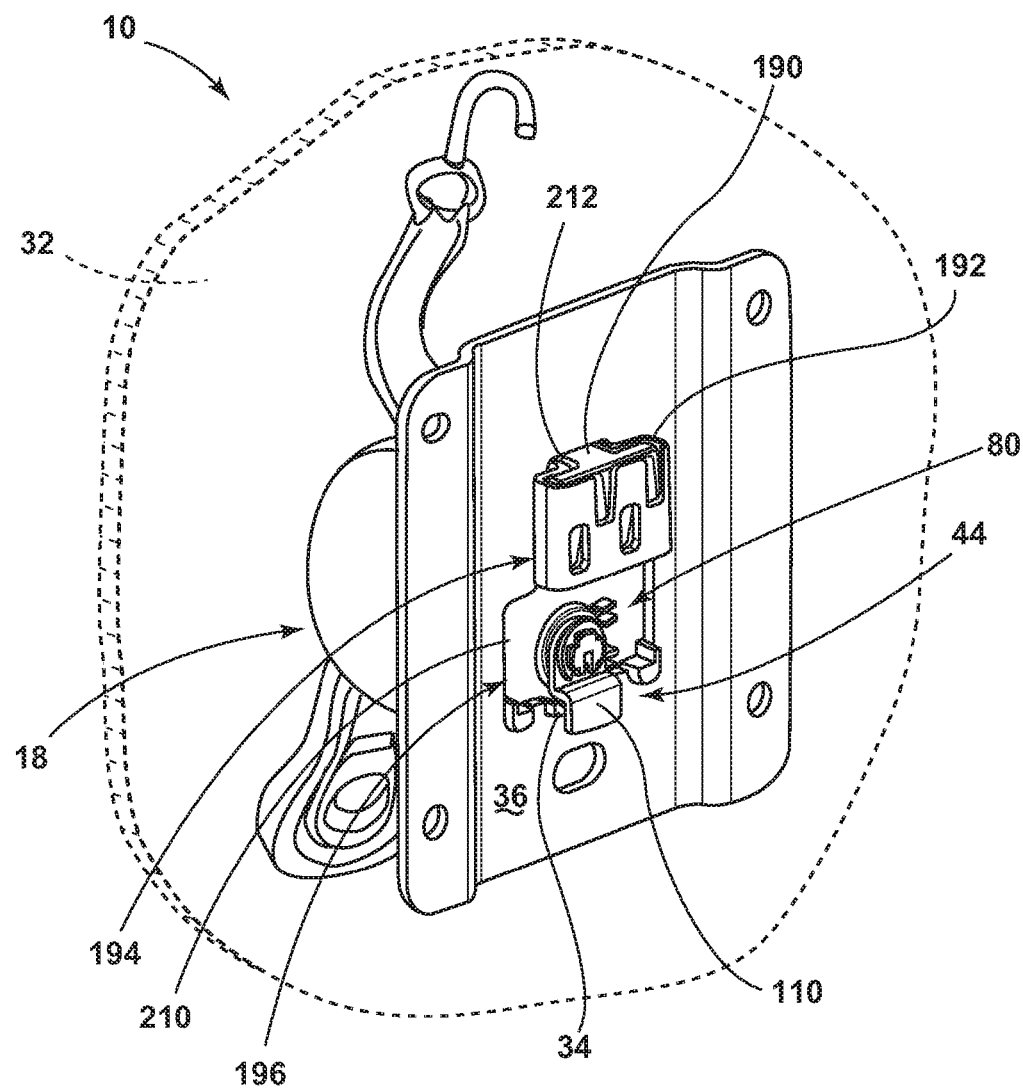
FIG. 8 is a rear perspective view of an aspect of the ratchet tie-down assembly shown from the interior cavity of the sidewall of the vehicle.
Figure 9:
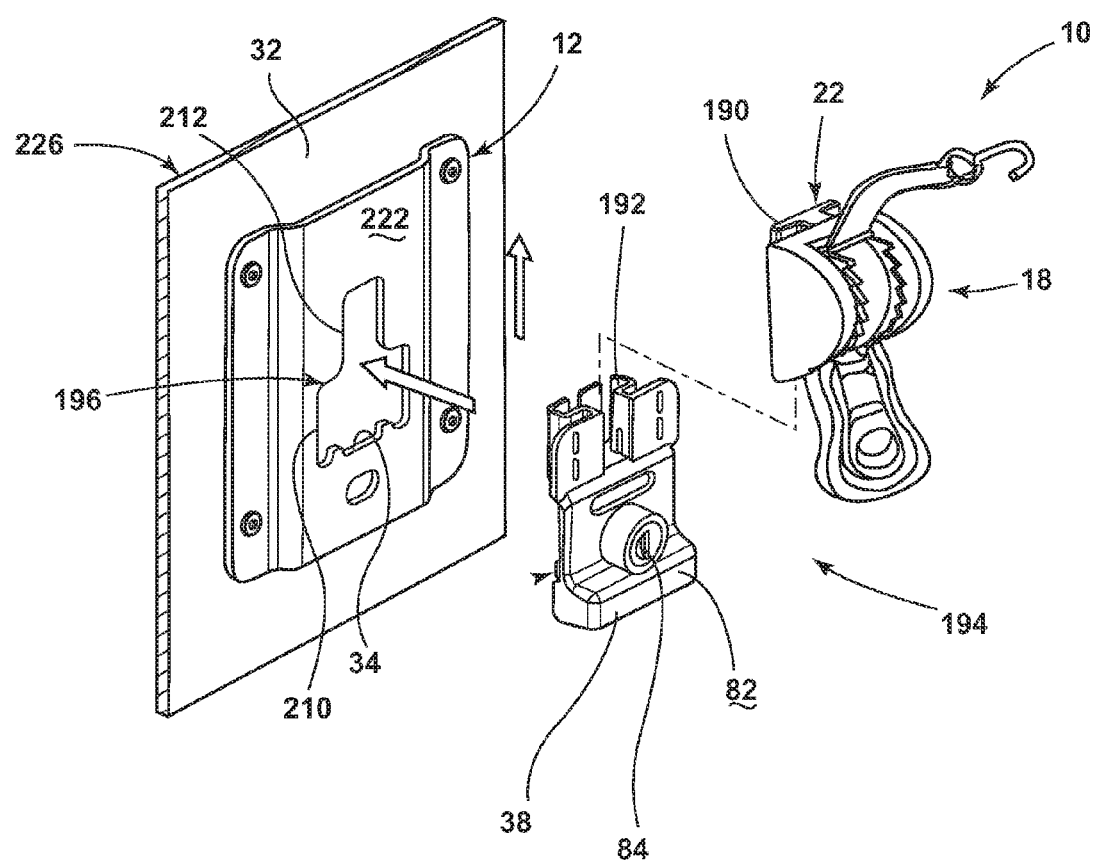
FIG. 9 is a partially exploded perspective view of the ratchet tie-down assembly of FIG. 7.

According to the various embodiments, as exemplified in FIGS. 1 and 2, it is contemplated that the ratchet assembly 10 can be installed on pick-up trucks, as illustrated in the figures. However, it is also contemplated that the ratchet assembly 10 can be installed in vehicles 16 other than pick-up trucks. Such vehicles 16 can include, but are not limited to, sport utility vehicles, sedans, vans, coupes, transportation vehicles, boats, motorcycles and other similar vehicles. In addition, while the ratchet assembly 10 is shown to be installed on an inward-facing surface 224 of the sidewall 32 of the vehicle bed 14, various embodiments of the vehicle ratchet assembly 10 can include an installation mechanism on an outward-facing surface 242 of the sidewall 32 of the vehicle bed 14. Alternate connection points of this type are configured such that the primary vertical and lateral support for the ratchet assembly 10 is on an outward-facing surface 242 of the vehicle 16, such as a bumper 250, cab 252, fender 254 or other surface that can serve to support the ratchet assembly 10. In such an embodiment, the primary support for the ratchet assembly 10 is via the interface bracket 38 being engaged with the interface plate 12 and the rotating mechanism 40 disposed in the secured position 44.

According to the various embodiments, it is contemplated that a vehicle 16 can include a plurality of interface plates 12 where the various ratchet mechanisms 18 can be installed on any one of the interface plates 12 of the vehicle 16. Similarly, various securing features 148 such as tie-down rings 60, cleats 260 (exemplified in FIGS. 11-12), moorings, hooks 160, anchors or other similar securing features 148 can be installed in any one of the other interface plates 12 of the vehicle 16.

According to various embodiments, as exemplified in FIGS. 1-12, it is contemplated that the various components of the ratchet assembly 10 and the standard interface plate 12 can be installed, removed and operated by a single individual without substantial assistance, or any assistance, from another person.

Referring again to the various embodiments as exemplified in FIGS. 1-12, it is contemplated that the ratchet frame 20 of the ratchet mechanism 18 can be made of various rigid materials that can include, but are not limited to, metals, metal alloys, polymers, combinations thereof, and other similar materials that can withstand the tension-type forces exerted upon the operable strap 24 through operation of the ratchet mechanism 18. The housing 26 of the ratchet mechanism 18 can be made of any one of various materials that can include, but are not limited to, plastic, metal, polymer, rubber, composite, combinations thereof, and other similar materials useful for protecting the mechanical aspects of the ratchet mechanism 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A ratchet assembly for a vehicle bed comprising:
a ratchet mechanism having a ratchet frame and a rigid interface anchor coupled to the ratchet frame, the ratchet mechanism further including an operable strap that is selectively extended and retracted from a housing of the ratchet mechanism through operation of at least one ratchet lever;

an interface plate disposed within a vehicle-bed sidewall that selectively receives the interface anchor within the vehicle-bed sidewall, the interface plate including a securing recess at least partially defined by an inward surface of the interface plate; and an interface bracket selectively extending from the interface anchor, wherein the interface bracket selectively engages the interface anchor to couple the ratchet assembly to the interface bracket, the interface bracket including a rotating mechanism operable between a plurality of rotational positions, wherein the plurality of rotational positions of the rotating mechanism includes an engaged position and a secured position when the interface bracket is received by the interface plate, the engaged position being defined by the rotating mechanism being free of engagement with the securing recess and further defined by the interface bracket being at least partially operable within the interface plate, and wherein the secured position is defined by the rotating mechanism being engaged within the securing recess and the interface bracket being substantially free of movement within the interface plate.

2. The ratchet assembly of claim 1, wherein the rotating mechanism includes a rotational member that operates the rotating mechanism between the plurality of rotational positions, and wherein the rotational member extends through a portion of the interface bracket and is operable from a front side of the ratchet assembly.

3. The ratchet assembly of claim 2, wherein the rotational member is a keyed cylinder.

4. The ratchet assembly of claim 1, wherein the rigid interface anchor is pivotally coupled to the ratchet frame.

5. The ratchet assembly of claim 1, wherein the rigid interface anchor is integral with the ratchet frame.

\* \* \* \* \*